United States Patent [19]
Theodorou et al.

[11] 3,879,228
[45] Apr. 22, 1975

[54] PHOTO-REGENERATIVE ELECTROCHEMICAL ENERGY CONVERTER

[75] Inventors: Ignatius E. Theodorou, Waban; Richard Payne, Sudbury, both of Mass.

[73] Assignee: The United States of America as represented by the Secretary of the Air Force, Washington, D.C.

[22] Filed: Mar. 6, 1972

[21] Appl. No.: 232,028

[52] U.S. Cl. .................. 136/206; 136/89; 136/155
[51] Int. Cl. ........................................... H01l 15/02
[58] Field of Search .............. 136/206, 89, 20, 155

[56] References Cited
UNITED STATES PATENTS

| | | | |
|---|---|---|---|
| 1,941,494 | 1/1934 | Ruben | 136/89 |
| 2,870,344 | 1/1959 | Brattain et al. | 136/89 |
| 2,945,078 | 7/1960 | Chapman et al. | 136/20 |
| 3,019,279 | 1/1962 | Blue et al. | 136/206 |
| 3,051,768 | 8/1962 | Kujas | 136/155 |
| 3,113,047 | 12/1963 | Lasser et al. | 136/89 |
| 3,114,658 | 12/1963 | Zaromb | 136/89 |
| 3,401,062 | 9/1968 | Lyons, Jr. | 136/206 |
| 3,445,296 | 5/1969 | Abe et al. | 136/20 |

*Primary Examiner*—Harvey E. Behrend
*Attorney, Agent, or Firm*—William J. O'Brien

[57] ABSTRACT

A photoelectrochemical device for converting incident radiation energy to electrical energy through the utilization of a photochemically reversible galvanic cell. Basically, the device is constructed of a sealed transparent container into which is placed a chemically inert anode coated with a photo-responsive material and a chemically inert cathode. A compatible electrolytic solution is also disposed within the container and provides a conductivity path across the electrodes to complete the electrochemical circuit. Decomposition of the photo-responsive material is induced by incident radiation passing through the transparent container. The products of the photo reaction recombine electrochemically by passing an electric current through a resistance load connected externally to the anode and the cathode.

2 Claims, 1 Drawing Figure

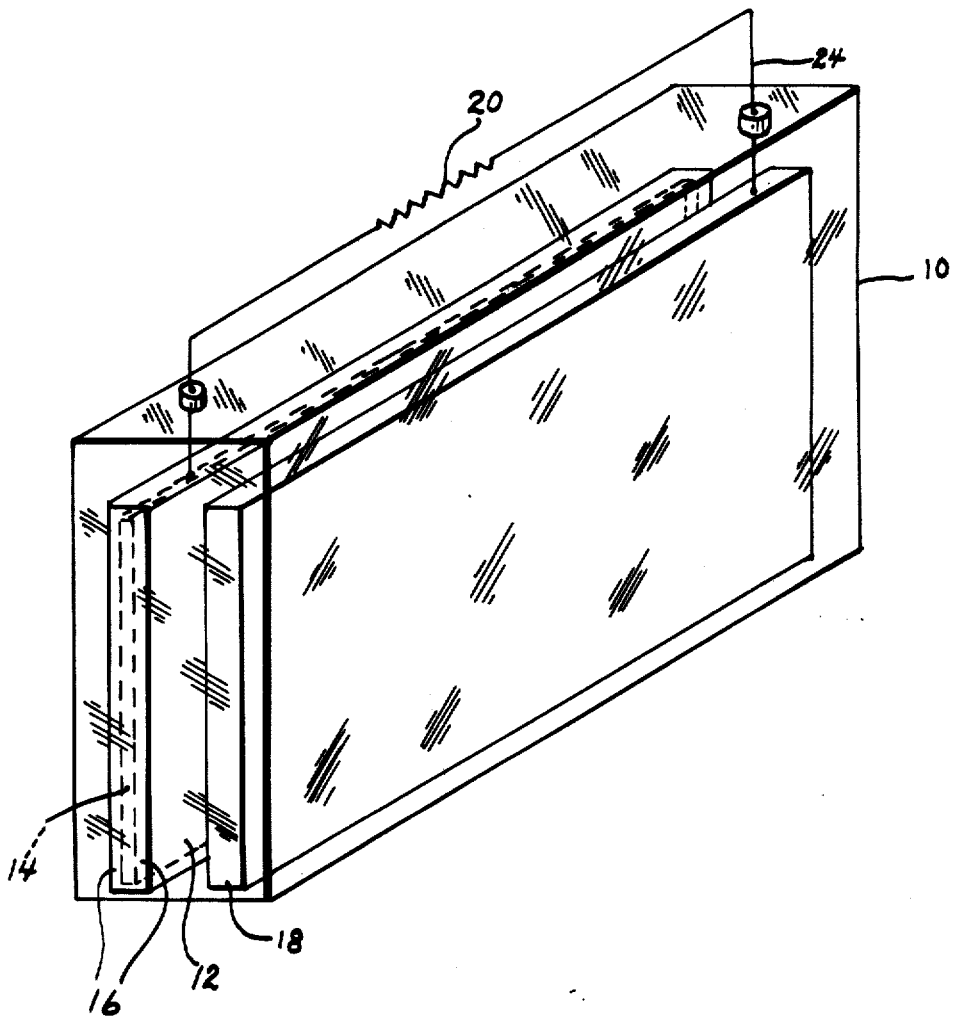

PHOTO-REGENERATIVE ELECTROCHEMICAL ENERGY CONVERTER

BACKGROUND OF THE INVENTION

This invention relates to an electrochemical device for converting incident radiation energy to electrical energy. More particularly, this invention concerns itself with a photo-regenerative electrochemical energy converter that combines a photo-decomposable substrate and an electrochemical cell in order to provide for the continuous conversion of incident radiation energy into electrical energy.

Aerospace applications often require the generation of small amounts of electrical current by devices which are capable of operating in an unattended manner. Various types of batteries, electrical cells and other electronic devices have been suggested as a means for satisfying this requirement. Among the more successful types of devices are those which comprise a pair of dissimilar electrodes disposed in a suitable electrolyte. A chemical interaction between the electrolyte and the electrodes generates an electric current which flows through an external circuit connected between the electrodes. During the operation of such cells, the chemical reaction causes the surface portion of at least one of the electrodes to be converted into a substance different from the material of which the electrode was originally composed. When a substantial portion of the surface of the electrode has thus been converted, the chemical reaction stops and the cell is rendered ineffective as a generator of electrical energy. The cell becomes discharged. Such cells may be recharged to their original condition by applying between their electrodes an external voltage sufficient to cause a current to flow between the electrodes and the electrolyte in a direction opposite to that which flowed when the cell supplied electrical energy to an external resistance. The net result is to convert the substance formed on the surface of the electrode during its initial operation as a generator into the same material of which the electrode was originally formed. Thus, the electrode is restored substantially to its original composition.

The utilization of radiant energy for recharging electric cells has been suggested heretofore in an attempt to eliminate the need for an external voltage source. However, the radiation sensitive devices presently known are complicated, inefficient, cumbersome and heavy since the electrode members must be positioned within different electrolytes and separated from each other by a separating membrane. The cumbersome nature of these devices makes them undesirable for aerospace operations which require small, lightweight and efficient devices capable of operating unattanded in a continuous manner.

In attempting to provide a device capable of generating an electric current by converting radiation energy to electric energy, it has been found that an efficient energy converter can be made in which all processes involved are thermodynamically reversible and no losses of energy occur during the conversion of the energy from one form to another. The invention accomplishes the efficient conversion of energy through a novel device which comprises, in general, a closed system consisting of a first component in which a photochemical decomposition reaction takes place because of the absorption of radiation energy by a photo sensitive coating and a reversible electrochemical oxidation reaction takes place either simultaneously with or subsequent to the decomposition reaction; a second component, in which an electrochemical reduction reaction takes place in a thermodynamically reversible manner without a loss of energy; and a third component, which acts as a coupling agent enabling the first and second components to effect the generation of electrical power and regeneration of the initial reactants. Thus, there is provided a means for the continuous conversion of incident radiation energy to electrical energy with the resultant production of an electric current.

SUMMARY OF THE INVENTION

In accordance with this invention, the continuous conversion of radiant energy to electric energy is accomplished by a device which combines a photoreactive substrate with an electrochemical cell. The photo-reactive substrate functions to absorb and react with incident radiation to provide electrode reactants to the cell. The desired reaction at the surface of the photo-sensitive substrate can be effected in response to various forms of incident radiant energy, including visible light and other forms of electromagnetic radiation, as well as corpuscular emission resulting from the disintegration of atomic nuclei.

The cell functions to separate the reactants at the electrodes, generate electrical energy and restore the photoreactive substrate surface to its initial state. It operates ideally in a steady state mode in which the photo-reactive substrate is regenerated by the electrochemical cell reaction at exactly the same rate as it is photo-chemically decomposed from the effects of incident radiation. The result is the continuous conversion of light energy into electrical energy.

Accordingly, the primary object of this invention is to provide a device for the direct and continuous conversion of radiant energy to electrical energy through the intermediate of an electrochemical cell.

Another object of this invention is to provide a device for the conversion of radiant energy to electrical energy that operates in a continuous manner without need for periodic recharging in the manner of secondary cells.

Still another object of this invention is to provide an electrochemical cell that is responsive to radiant energy from a source external to the cell, such as sunlight, to enhance or restore its effectiveness.

A further object of this invention is to provide an electric cell which is capable of being recharged by radiant energy at a useful rate and also is capable of storing electrical energy for a substantial length of time.

Still a further object of this invention is to provide a device for converting radiant energy to electrical energy in which all electrochemical processes are thermodynamically reversible and low losses of energy occur during conversion of the energy from one form to another.

Still a further object of this invention is to provide a device for the conversion of radiant energy to electrical energy that is efficient in operation, simple in construction, light-weight and non-cumbersome, and employs readily available materials.

The above and still further objects of the invention will become readily apparent from the description of the invention which follows when taken in conjunction with the accompaning drawing.

BRIEF DESCRIPTION OF THE DRAWING

In the drawing

The FIGURE represents an isometric view of an electro-chemical energy converter constructed in accordance with this invention.

DESCRIPTION OF THE PREFERRED EMBODIMENT

Pursuant to the aforestated objects, the photo-regenrative electrochemical energy converter of this invention comprises a photo-reactive substrate in combination with an electrochemical galvanic cell. Basically, the device comprises a sealed, transparent, gas-tight, chemically inert container into which is placed a pair of electrodes, and a suitable electrolyte for providing a conductivity path across the electrodes. The first electrode which forms the anode of the electrochemical circuit, comprises a chemically inert, electrically conducting material coated with a very thin layer of a photo-reactive salt. The salt is not only capable of being chemically decomposed through the effects of incident radiation energy, but the products of the photochemical reaction can be reversibly regenerated to their original state through the intermediary of an electrochemical reaction.

Among the photo-decomposable salts found to be especially useful for the device of this invention are the silver halides. For example, silver bromide, silver chloride, silver iodide, have all proven to be useful.

The second electrode, which forms the cathode of the electrochemical circuit, is also composed of a chemically inert, electrically conducting material. Among the inert conductors found to be suitable as an electrode material are platinum, platinum black, graphite, palladium, gold, iridium and their alloys.

The electrolyte may be composed of an aqueous or nonaqueous solution of a halide salt, or it may be a solid electrolyte. Ammonium, potassium, lithium, sodium, zinc and calcium halides are all suitable as long as they are compatible and non-solvents for the particular photo-responsive substrate coating used in the device.

The key element of the device of this invention is the chemically inert anode coated with a photo-responsive substrate material.

The anode may comprises platinum, platinum black, graphite, palladium, gold, iridium and their alloys. However, a silver anode would render the device inoperative because of the chemical corrosion problems generated by using silver. Silver is not chemically inert in the system of this invention. Black photolytic silver accumulates on the surface of the photosensitive material, thus blocking the absorption of light by the photo-responsive material. In a cyclic process, incident radiation passes through the transparent container and induces decomposition of the substrate photochemically. When a current is passed through an external load, an electrochemical recombination of the products of the photo reaction takes place with the regeneration of the photo-responsive coating.

The photo-sensitive metal halide coating on the anode is decomposed by the action of light and the photoproducts separate by diffusion of the free halogen molecule from the substrate into the electrolyte with the metal remaining in situ on the anode. When current is drawn from the cell, the free halogen is reduced at the cathode and the halide anion is discharged at the anode to regenerate the original photo-sensitive metal halide. During regeneration an electron $e^o$ is transferred through the external circuit of the cell. Thus, the photo-sensitive salt is regenerated to its original form and in its original position by passage of the electric current.

For optimized operational results, the photo-sensitive substrate is laid down as a uniform, non-porous thin film using conventional coating methods. Vacuum sublimation, pasting and painting methods may be utilized. An especially effective method, however, results when thin films are prepared by dipping the anode in a molten bath of the photo-sensitive metal halide. For example, electrodes prepared by dipping a platinum anode into a molten bath of silver chloride and stored in the dark gave photo-currents of ~ 1 ma/cm$^2$ and ratios of light current to dark current of 10–100 with a response time of ~ 0.5 sec. Film thicknesses on the order of about 1.0 to 20 microns thick uniformly deposited on the inert metal anode have proved most feasible.

Referring now to the drawing, there is illustrated a photo-regenerative, electrochemical energy converter suitable for use with the present invention. The novel energy converter comprises a sealed transparent glass container 10 containing a 0.01 molar potassium chloride aqueous electrolyte 12. An anode, composed of a platinum base 14 with a silver halide coating 16, having a thickness of about one micron is immersed within the electrolyte 12 together with a platinum cathode 18. The coating 16 is deposited on the base 14 in a non-porous, uniform manner. The electrodes 16 and 18 are positioned adjacent and at a distance of about 0.5 cm. from each other. They are connected to an external resistance 20 by means of terminals 22 and 24.

The platinum anode 14 was coated prior to assembly of the cell. It was first cleaned chemically by immersion in aqua regia and then washed in distilled water. After cleaning, the anode was heated to red heat in a gas flame. The cleaned electrode was then immersed for approximately 20 sec. in a bath of molten silver chloride maintained at a temperature of about 700°C. The electrode was withdrawn from the bath and allowed to cool. It was then inserted into the container 10 together with the cathode 18 and the electrolytic solution 12 and the container was sealed in a conventional manner not shown. It has been found that the addition of free halogen molecules to the electrolyte increases the cell's overall efficiency.

The specific cell shown in the drawing is based on a simple galvanic cell in combination with a photo-decomposable substrate. The cell is initially in the fully discharged state. Incident radiation penetrates the glass container 10 and impinges on and is absorbed by the silver chloride including a photochemical reaction. The silver remains in situ on the anode 14 while the chlorine molecules diffuse into the electrolyte 12 and eventually cross to the cathode 18 where they become available for subsequent electrochemical reduction. The following electrochemical half cell reactions take place at the anode and cathode respectively:

(1) $Ag + Cl^- = AgCl + e^o$ (2) $\frac{1}{2} Cl_2 = Cl^- - e^o$

The overall net chemical reaction is:

(3) $Ag + \frac{1}{2} Cl_2 = AgCl$ accompanied by the passage of 1 faraday of electric charge through the external load.

The electrochemical reaction at the electrodes is initiated by connecting terminals 22 and 24 to a resistance load 20 and drawing electric current from the cell. The cell reactants are consumed when current is drawn from the cell according to the half cell reactions above. At the cathode, chlorine is reduced to chloride ions which diffuse into the electrolyte. At the anode, chloride ions are discharged on the silver to form silver chloride so that the cell returns precisely to its original condition. The electrochemical reaction occurring during discharge is reversed by photochemically decomposing the silver chloride in accordance with the following reactions:

(4) $AgCl + h\nu = Ag + \frac{1}{2} Cl_2$

During the operation of the device of this invention, the anode electrode becomes very efficient by becoming a composite electrode composed of specks of photolytic silver embedded in the silver chloride substrate. The entire device remains in a state of equilibrium during shelf storage since the electrochemical reaction is not initiated unless a current is withdrawn. Nor, does a photochemical reaction take place without the effect of incident radiation. Consequently, the device of this invention is corrosion-free when not functioning but can be quickly utilized to convert radiant energy to electrical energy through the intermediary of incident radiation. Energy conversion is accomplished automatically and in a contnuous manner without the need for periodic recharging from an external voltage source. The device is especially valuable and useful as a solar cell for aerospace applications since it is simple, lightweight and operates continuously in an unattended manner.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

What is claimed is:

1. A photoelectrochemical energy converter for converting incident radiant energy into electrical energy which comprises a potassium chloride aqueous electrolyte disposed within a sealed, inert, radiation-transparent envelope, a first electrode photochemically responsive to incident radiation energy and composed of a platinum substrate coated with a thin uniform layer of silver chloride, a second electrode composed of platinum, said first and second electrodes both immersed within and in contact with said electrolyte which provides a conductivity path therebetween.

2. A photoelectrochemical energy converter in accordance with claim 1 wherein (free chlorine molecules are added to the) said electrolyte contains free chlorine molecules.

* * * * *